April 21, 1936.   R. R. HOLDEN   2,037,905
TROLLEY GUIDE
Filed Dec. 14, 1932   2 Sheets-Sheet 1
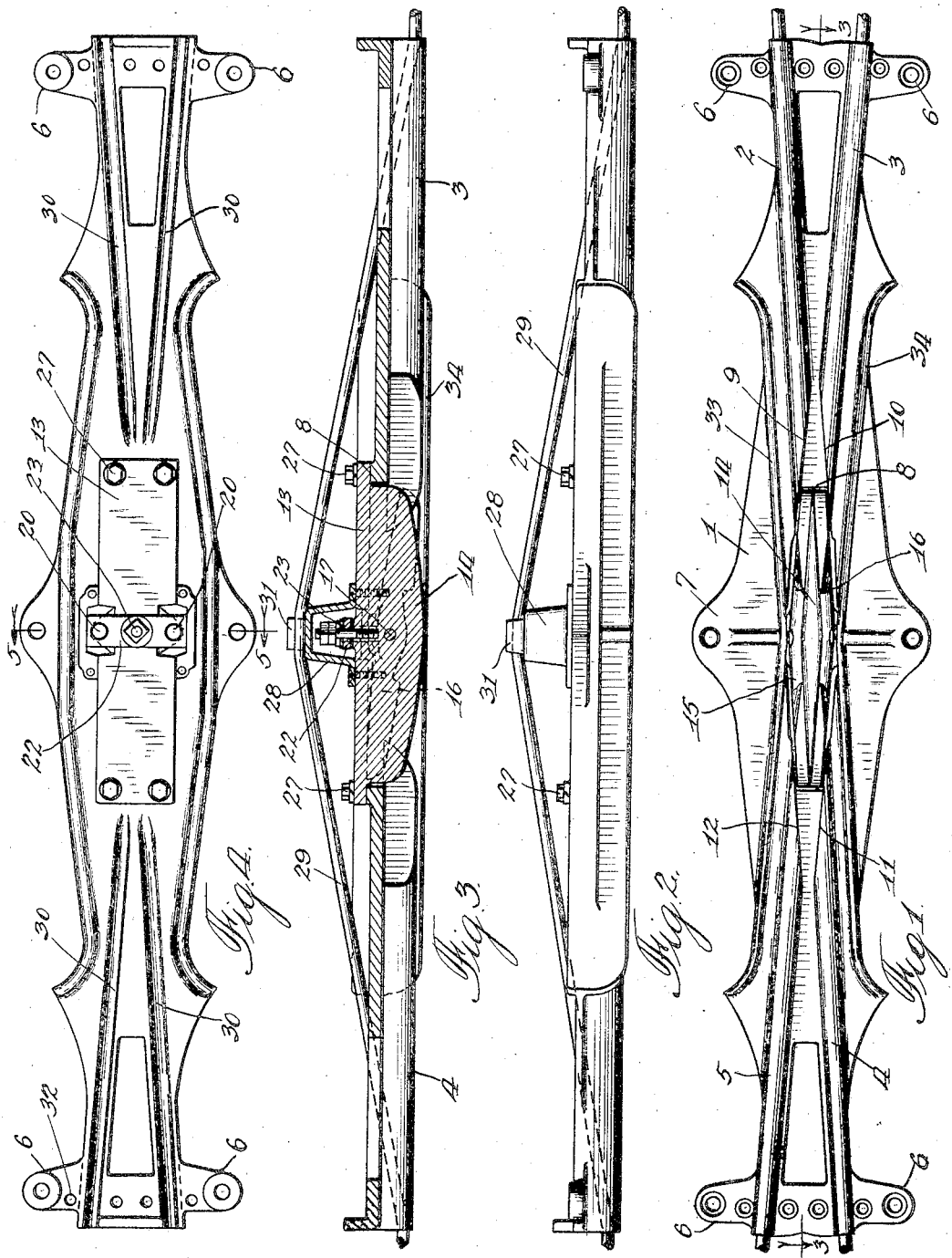
Inventor
Richard Roy Holden
By Jones, Addington, Ames & Seibold
Attys.

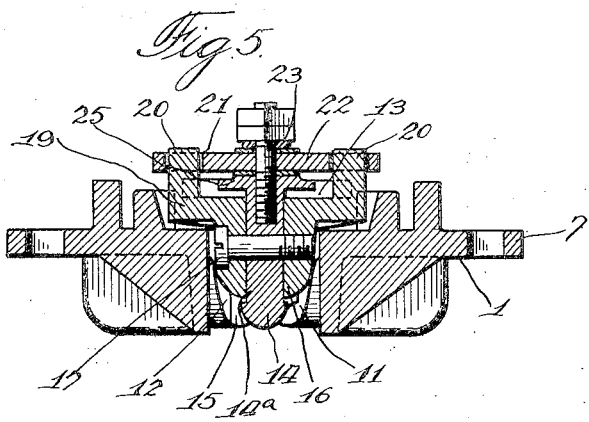
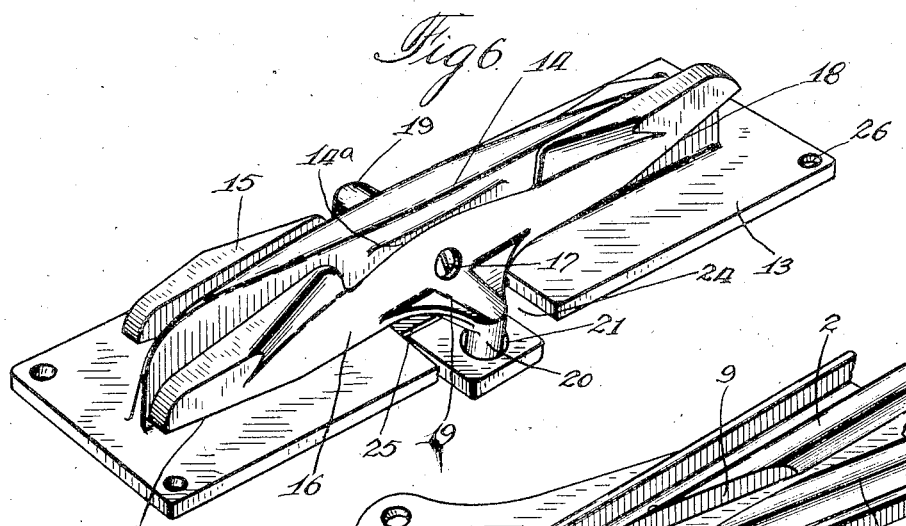
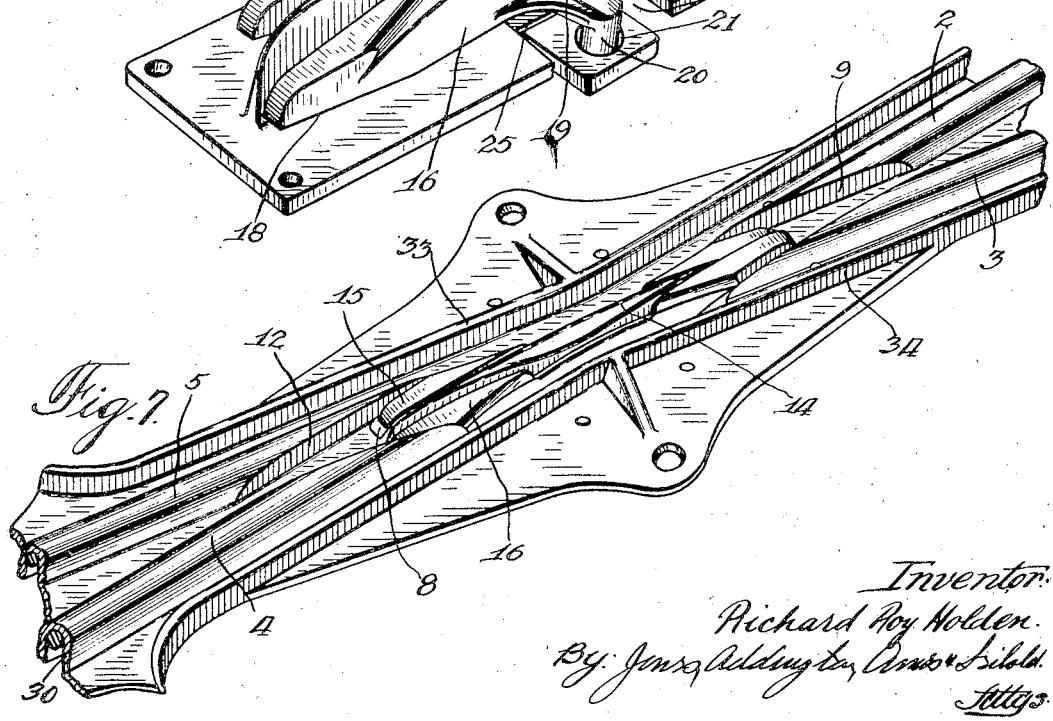

Patented Apr. 21, 1936

2,037,905

UNITED STATES PATENT OFFICE 2,037,905

TROLLEY GUIDE

Richard Roy Holden, Highland Park, Ill.

Application December 14, 1932, Serial No. 647,138

24 Claims. (Cl. 191—37)

This invention relates to overhead trolley apparatus and has particular reference to trolley crossings or cross-overs.

More particularly this invention relates to trolley crossing having means for positively guiding a current-collecting member passing thereunder to prevent switching from one trolley wire to another even when the angle between the two is extremely small.

In the present invention the trolley crossing may be provided with a pair of runners at each end forming an acute angle, the diagonally opposed runners being substantially a continuation of each other and engaging the same trolley wire. Movable members are provided between the inner ends of the runners and serve to guide the current-collecting member from any runner along which it is passing to the diagonally opposite runner. The movable guide members are so shaped and arranged that they automatically are positioned by the passage of the current-collecting member thereunder. With such a construction the angle between the trolley wires or the adjacent runners positioned over the trolley wires may be extremely small, in some instances being no more than eight degrees or even less.

The movable guide members will positively guide a current-collecting member passing in either direction between either pair of diagonally opposed runners. In effect, when the current-collecting member comes in contact with the movable members, the latter are positioned to provide substantially a continuous runner comprising the runner along which the current-collecting member is passing, the movable means and the diagonally opposed runner. It is thus to be seen that irrespective of the direction of approach of a current-collecting member to the trolley crossing and irrespective of the runner along which it is passing a substantially continuous runner is provided for the crossing, thereby obviating any possibility of a current-collecting member switching from one trolley wire to another during the crossing.

An object of this invention is to provide a trolley crossing having means for positively guiding a current-collecting member at all points during the crossing.

A further object is to provide a crossing having automatically acting guide means for guiding a current-collecting member passing in either direction between any set of diagonally opposed runners.

Another object is to provide a trolley crossing which may be used when the angle between the adjacent runners is less than ten degrees, as well as when the angle is greater than ten degrees.

A still further object is to provide a trolley crossing of the type referred to above in which the movable guide means are automatically actuated by the current-collecting member during the crossing.

Still another object is to provide a trolley crossing of simple and durable construction which will withstand hard usage and wear.

Further objects and advantages will be apparent from the following description when taken together with the accompanying drawings, in which latter:

Figure 1 is a bottom plan view of the trolley crossing embodying the present invention;

Fig. 2 is a side elevational view;

Fig. 3 is a longitudinal cross-sectional view taken on the line 3—3 of Fig. 1;

Fig. 4 is a top plan view with a portion removed;

Fig. 5 is a cross-sectional view taken on the line 5—5 of Fig. 4 showing a form of movable mechanism which may be employed;

Fig. 6 is a bottom perspective view of the movable guide mechanism for guiding the current-collecting member between diagonally opposed runners; and Fig. 7 is a bottom perspective view of the central portion of the trolley crossing showing the movable guide means positioned with respect to the runners.

Referring more particularly to the drawings, there is shown a trolley crossing comprising a base member 1 having runners 2, 3, 4, and 5, depending therefrom. Perforated ears 6 are provided in the base member 1 adjacent the outer ends of the runners and perforated ears 7 are provided adjacent the central portion of the crossing. These ears provide means for connection to cross spans to support the crossing in proper position.

It has been found preferable to form the base member 1 and the runners 2, 3, 4, and 5, integrally by casting the same in one piece, although this is not necessary and they may be formed in any manner desired.

In forming the base member 1, a central aperture or opening 8 may be provided in which the movable guide members, hereinafter to be described, are positioned. As shown, particularly in Figure 1, adjacent runners 2 and 3, and adjacent runners 4 and 5, may be formed in pairs.

The present invention is particularly suitable where the angle between the intersecting trolley wires is extremely small. In the drawings, the acute angle formed between adjacent runners 2 and 3, or more specifically between the angle formed by the planes of the sides thereof, and between adjacent runners 4 and 5 is drawn to represent an angle of approximately eight degrees with the diagonally opposed runners 2 and 4 being substantially a continuation of each other, and the diagonally opposed runners 3 and 5 being substantially a continuation of each other.

The inner ends of the runners are cut on a bias as shown at 9, 10, 11 and 12. It has been found desirable to make the faces cut on a bias substantially parallel to the inner side of the adjacent runner, although this is not absolutely necessary. Thus, face 9 is substantially parallel to the inner side of runner 3, face 10 is substantially parallel to the inner side of runner 2, face 11 is substantially parallel to the inner side of runner 5, and face 12 is substantially parallel to the inner side of runner 4. The distance between the closest portions of adjacent runners at which point the biased faces 9, 10, 11, and 12, preferably begin, is sufficient to permit the passage of a flange of a current-collecting member therebetween. Although the figures are intended to show an eight degree angle between adjacent runners, that is, if the runners were extended until they met, this angle may be even less and still permit the device to work satisfactorily.

Means are provided for guiding a current-collecting member passing along the runner 2 to the runner 4 or vice versa, and along the runner 3 to runner 5 and vice versa. This means, shown particularly in Figs. 5 and 6, which may be assembled and attached to the rest of the device as a unit will now be described. It comprises a base plate 13 for attachment to the upper side of base member 1 over opening 8. Depending from base plate 13 through opening 8 is an elongated lug 14 which is preferably substantially diamond-shaped when viewed from below. The lower surface of the lug is preferably rounded and the upper portion is reduced adjacent the center as shown at 14a in Fig. 5. The lug is positioned intermediate the inner ends of the runners and is of such length that the ends thereof lie between the biased faces of adjacent runners and substantially equi-distant from said faces. The upper face of the lug at the center lies in substantially the same horizontal plane as the lower faces of the runners, although it may extend slightly therebelow. From the center the lower face of the lug may slope gradually upwards toward the ends which are rounded upwardly to the base plate 13.

On either side of lug 14 and closely adjacent thereto there are provided guide members 15 and 16 of substantially the same length as lug 14. These guide members 15 and 16 are pivotally connected by a pivot 17 to the lug 14 substantially midway between the ends thereof so that each guide member is provided with a rocker movement. One form of pivot that may be used is a screw which fits loosely in guide member 15 and threads into guide member 16. This particular arrangement is desirable for reasons which will be hereinafter disclosed, although other means may be used if desired.

The preferred form of guide member is shaped at the ends thereof to fit between the end of the lug and the adjacent biased face of the runner. The width preferably remains substantially uniform to a point about opposite the inner ends of the runners. The guide member then tapers inwardly toward the lug as the lug becomes wider. Each end of the guide member is similarly shaped, while there is a cut-out portion between the ends in order to allow for the enlarged center portion of the lug 14. The ends of the guide members 15 and 16 are rounded and taper upwardly to the upper face so that when a flange of a current-collecting member comes in contact therewith it may easily slide thereunder. When in position, the upper face of the central portion of the guide members is a distance below the lower face of base plate 13, and the upper faces of the ends of the guide members slope downwardly as shown at 16 to permit rocker movement of these guide members.

When the guide members are positioned to provide for the crossing of a current-collecting member with one end of one of the guide members up and the other end down and the other guide member in reverse position, the lower faces of the lower ends of the guide members 15 and 16 will be substantially flush with the lower faces of the adjacent runners and the lower face of lug 14. At the same time, the lower faces of the upper ends of the guide members will be either substantially flush with the lower face of base member 1 or will extend thereabove into opening 8 so that the current-collecting member may smoothly pass from one runner to the runner diagonally opposite thereto.

Wing portions 19 extend outwardly from the upper portion of the guide members 15 and 16 above the pivot 17 (Fig. 5) and are provided with upwardly extending, preferably rounded, fingers 20 which loosely fit into apertures 21 provided in the connecting member or bar 22. This connecting member may be loosely mounted on pivot 23 substantially midway between the ends of the connecting member or otherwise provided with a rotational movement without the use of a pivot; thus, as the connecting member pivots, the finger 20 of guide member 16 is moved in one direction and the finger 20 of the guide member 15 is moved in the opposite direction. This tends to rock guide member 16 in one direction and guide member 15 in the opposite, so that, as connecting member 22 pivots, the guide members 15 and 16 are rocked in opposite directions. With this construction the two guide members in one direction automatically rocks the other in the opposite direction. Although a particular construction for causing said guide members to rock in opposite directions has been described, it will be evident that many other arrangements for accomplishing the same result may be employed instead.

In order to provide clearance for the mechanism just described, the base plate 13 is provided with a cut-out portion 24 in each side thereof adjacent the middle, and a reduced portion 25 connects the two ends of base plate 13.

Apertures 26 are provided in base plate 13 which register with threaded openings in base member 1 so that to secure base plate 13 and the parts carried thereby to the rest of the device, it is only necessary to position the base plate 13 on the upper side of the crossing over opening 8 with the lug and guide members extending through the opening 8, and secure the screw bolts 27 in place. A cover 28 fits over bar 22 and associated mechanism and serves to protect the same from the elements.

When the crossing is in operative position, the trolley wires 29 lie in the grooves 30 provided in the reverse side of the runners and pass over or around the top of cover 28. When the wires pass over cover 28, they are prevented from sliding off the same by upwardly extending flanges 31. The trolley wires 29 are held adjacent the lower side of grooves 30 at the outer ends thereof by approaches of usual type (not shown) which are secured to the outer ends of base member 1 by bolts passing through the apertures 32, in the usual manner.

Downwardly depending flanges 33 and 34 are provided on the base member 1 adjacent the inner ends of the runners. The flanges are preferably formed integrally with the base member 1 and the runners. One end of flange 33 is parallel to runner 2, and the other end of flange 33 is parallel to runner 5, the two ends being spaced from the runners a sufficient distance to permit the passage therebetween of one flange of a current-collecting member. Flange 34 has one end parallel to runner 3 and the other end parallel to runner 4, this flange being also spaced a sufficient distance from the runners 3 and 4 to permit the passage of one flange of a current-collecting member therebetween. These flanges serve to some extent in guiding the outer sides of a current-collecting member during the crossing. It is preferable to curve the ends of the flanges 33 and 34 outwardly away from the runners.

Considering the position of the movable guide members as shown in Figs. 6 and 7, the operation of the crossing will now be described. In these figures, it is to be noted that when looking at the drawings, the left end of guide member 15 and the right end of guide member 16 are in upper position while the right end of guide member 15 and the left end of guide member 16 are in lowered position. Although the constructions shown in Figs. 6 and 7 are upside down with respect to their position when in use, they will be described as shown for the purpose of clearness and simplicity.

A current-collecting member passing along runner 5 in the direction of runner 3 is guided during the crossing as follows:

As it approaches the inner end of the runner 5, which is cut on a bias, the inner flange rides on the upper rounded surface of the lowered end of guide member 16, being guided prior to this by runner 5 and in case there is a side pull on the current-collecting member by flange 33. The flange which first rides on the lowered surface of guide member 16 engages the exposed side of lug 14, and as it continues it passes over the narrowed portion of the lowered end of guide member 16 and alongside the central portion of lug 14. Continuing further, it engages the outer side of the upper end of guide member 16 which guides it to a position to engage the pointed end of runner 3 and pass between the runner and flange 34. The opposite flange of the current-collecting member passes alongside of the upper end of guide member 15 between it and flange 33 until it reaches the center of the device where it is guided by the lug itself. As it continues further, the edge of the flange rides on the upper surface of the lowered end of guide member 15 until it engages the inner side of runner 3; thus, during the whole passage from runner 5 to runner 3 there is a continuous connection between the two runners on each side of which the flanges of the current-collecting member pass, being guided thereby, and, in certain instances, to some extent by the flanges 33 and 34, particularly when a swivel harp is used for carrying the trolley wheel or shoe. If a current-collecting member passes along runner 3 toward runner 5, the movable parts remain in the same position and the operation is reversed during the crossing in the opposite direction.

Considering next the passage of a current-collecting member along runner 4, with the movable guide members 15 and 16 in the position previously described, the operation will be as follows:

When the inner flange of the current-collecting member approaches the movable guide members, it will be positioned by runner 4 and flange 34 so that it comes in contact with the upper end of guide member 15. Due to the rounded ends of the guide members and the rounded ends of the current-collecting member, whether a trolley shoe or wheel, the contact of the inner flange of the current-collecting member will force the left end of guide member 15 downwardly and thereby the opposite end upwardly. Due to the means hereinbefore described operatively connecting the two guide members, the movement of guide member 15 in one direction automatically rocks the other guide member in the opposite direction. Thus, as soon as the flange of the current-collecting member engages the left end of guide member 15, the movable parts are positioned to provide a continuous guide between the runner 4 and the runner 2, and guide member 16 now acts in a manner similar to that previously described with reference to guide member 15 during the crossing from runner 3 to runner 5.

With this construction, there is no possibility of a current-collecting member switching from runner 3 to 4 or vice versa during the crossing or from runner 2 to 5 or vice versa, and this is true even when the angle between runners 2 and 3 or runners 4 and 5 is very small, for instance, six or eight degrees.

In referring to the angle between adjacent runners, it is to be understood that this reference is to runners when in substantially the position shown in the drawings, that is, with sufficient room between them to permit the passage of one flange of a current-collecting member and does not mean that the inner sides of the two runners meet.

Due to the rocker movement of the guide members 15 and 16, the crossing is not only positive but is quite smooth, as there is very little difference in height between the lower face of the runner, the lower face of the lug, and the lower ends of the guide members 15 and 16. Furthermore, although it is not necessary for the operation of the device, it is preferable to have the width of the guide means between the diagonally opposed runners slightly narrower than the width of the runners. Thus, as shown particularly in Figure 1, the width of the lug and the lowered ends of the rocker guide members 15 and 16 is nearly the same as that of the runners.

While I have shown and described but a single embodiment of the present invention, it will be apparent to those skilled in the art that various modifications thereof may be made without departing from the spirit and scope of this invention, and, therefore, I wish to be limited only by the prior art and the scope of the appended claims.

Having thus described my invention, what I claim and desire to secure by Letters Patent is:

1. A trolley guide comprising two pairs of runners, the runners of each pair forming an acute angle with diagonally opposed runners being substantially a continuation of each other, and movable means operable as a unit adjacent the inner ends of said runners for positively guiding a current-collecting member passing in either direction between either pair of said diagonally opposed runners, said means being actuated by direct contact of the current-collecting member therewith.

2. In a trolley guide having two pairs of runners with diagonally opposed runners being substantially a continuation of each other, vertically moving means for positively guiding a current-collecting member passing in either direction between either pair of said diagonally opposed runners, said means being removable as a unit from said trolley guide.

3. In a trolley guide having two pairs of runners with diagonally opposed runners being substantially a continuation of each other, vertically movable means which may be moved as a unit to form a substantially continuous guide member between either pair of said diagonally opposed runners, said means being automatically actuated as a unit by contact of a current-collecting member therewith.

4. In a trolley guide having two pairs of runners with diagonally opposed runners being substantially a continuation of each other, a pair of vertically and oppositely movable members for guiding a current-collecting member between either pair of said diagonally opposed runners.

5. In a trolley guide having two pairs of runners with diagonally opposed runners being substantially a continuation of each other, a pair of vertically and oppositely movable, pivotally mounted members for guiding a current-collecting member between either pair of said diagonally opposed runners.

6. In a trolley guide having two pairs of runners with diagonally opposed runners being substantially a continuation of each other, a pair of vertically and oppositely movable rocker guide members for guiding a current-collecting member between either pair of said diagonally opposed runners.

7. In a trolley guide having two pairs of runners with diagonally opposed runners being substantially a continuation of each other, a pair of vertically movable guide members for guiding a current-collecting member between either pair of said diagonally opposed runners, and means operatively connecting said guide members whereby movement of the one causes the other to be moved reversely.

8. In a trolley guide having two pairs of runners with diagonally opposed runners being substantially a continuation of each other, a pair of oppositely movable rocker guide members mounted to rock about a single pivot for guiding a current-collecting member between either pair of said diagonally opposed runners, and means operatively connecting said rocker guide members whereby movement of the one causes the other to be moved reversely.

9. In a trolley guide having two pairs of runners with diagonally opposed runners being substantially a continuation of each other, an elongated lug substantialy centrally disposed with respect to the inner ends of said runners, and a vertically movable guide member on either side thereof, said lug and said movable members acting to guide a current-collecting member in passing between either pair of said diagonally opposed runners.

10. In a trolley guide having two pairs of runners with diagonally opposed runners being substantially a continuation of each other, an elongated lug substantially centrally disposed with respect to the inner ends of said runners and extending outwardly beyond the inner ends of said runners, and a movable guide member on either side thereof of substantially the same length as said lug, said lug and said movable means acting to guide a current-collecting member in passing between either pair of said diagonally opposed runners.

11. In a trolley guide having two pairs of runners with diagonally opposed runners being substantially a continuation of each other, an elongated lug substantially centrally disposed with respect to the inner ends of said runners, a vertically movable rocker guide member on each side of said lug, and means operatively connecting said rocker guide members to cause them to move oppositely.

12. In a trolley guide having two pairs of runners with diagonally opposed runners being substantially a continuation of each other, an elongated lug substantially centrally disposed with respect to the inner ends of said runners, a rocker guide member on each side of said lug, and means operatively connecting said rocker guide members to cause them to move oppositely, said rocker guide members being moved to proper position by a current-collecting member passing thereunder in contact therewith.

13. A trolley guide comprising two pairs of runners, the runners of each pair forming an acute angle with diagonally opposed runners being substantially a continuation of each other, and means movable as a unit automatically acting to guide a current-collecting member from any runner along which it is passing to the runner diagonally opposite thereto, said means being actuated by contact with a current-collecting member therewith.

14. A trolley guide comprising two pairs of runners, the runners of each pair forming an acute angle with diagonally opposed runners being substantially a continuation of each other, the inner ends of said runners being cut on a bias with the inner biased face of each runner substantially parallel to the inner side of the adjacent runner, and means operable as a unit for guiding a current-collecting member between either pair of diagonally opposed runners.

15. A trolley guide comprising two pairs of runners, the runners of each pair forming an acute angle with diagonally opposed runners being substantially a continuation of each other, the inner ends of said runners being cut on a bias with the inner biased face of each runner substantially parallel to the inner side of the adjacent runner, and vertically movable means operable as a unit positioned intermediate the inner ends of said runners and extending a distance between the biased faces thereof for guiding a current-collecting member between either pair of the diagonally opposed runners.

16. A trolley switch comprising a base member, two pairs of runners depending therefrom with diagonally opposed runners being substantially a continuation of each other, and a pair of oppositely movable rocker guide members for guiding a current-collecting member between either pair of said diagonally opposed runners, a portion of the lower faces of the upper ends of said rocker guide members when in operative position being substantially flush with the lower surface of said base plate and a portion of the lower faces of the lower ends of said rocker guide members lying in substantially the same plane as the lower faces of said runners.

17. A trolley guide comprising two pairs of runners with one runner of each pair oppositely disposed and in substantial alignment with a runner of the other pair, vertically movable means for guiding a current-collecting member passing in either direction between either pair of said substantially aligned runners, and depending flanges substantially parallel to the outer sides of said runners and spaced from said runners and said guide a sufficient distance to permit the passage of one flange of a current-collecting member between the same.

18. In a trolley guide having two pairs of runners with diagonally opposed runners being substantially a continuation of each other, a pair of vertically movable members for guiding a current collecting member between either pair of said diagonally opposed runners, said members being operatively connected together for simultaneous movement.

19. In a trolley guide having two pairs of runners with diagonally opposed runners being substantially a continuation of each other, a pair of vertically and oppositely moving guide members for guiding a current collecting member between either pair of said diagonally opposed runners and means operatively connecting said members whereby movement of one causes the other to be moved reversely.

20. In a trolley guide having two pairs of runners with diagonally opposed runners being substantially a continuation of each other, a pair of vertically and oppositely movable rocker guide members mounted to rock about a single pivot for guiding a current collecting member between either pair of said diagonally opposed runners and means operatively connecting said rocker guide members whereby movement of one causes the other to be moved reversely.

21. In a trolley guide having two pairs of runners with diagonally opposed runners being substantially a continuation of each other, an elongated lug substantially centrally disposed with respect to the inner ends of said runners and a movable guide member on either side thereof of substantially the same length as said lug, said lug and said movable means acting to guide a current-collecting member in passing between either pair of said diagonally opposed runners.

22. A trolley guide comprising a body and a plurality of spaced runners secured thereto, a plurality of unitary acting vertically movable means mounted to connect said runners, two at a time in a plurality of combinations, said means being automatically actuated by contact of a current collecting member therewith.

23. A trolley guide comprising a body and a plurality of spaced runners secured thereto, vertically and oppositely movable means movable as a unit mounted to connect said runners two at a time in a plurality of combinations, said means being automatically actuated by contact of a current collecting member therewith.

24. A trolley guide comprising a body and a plurality of spaced runners secured thereto, a plurality of vertically and oppositely movable means pivotally mounted intermediate the ends thereof about a horizontal pivot to connect said runners two at a time in a plurality of combinations, said means being automatically actuated by contact of a current collecting member therewith.

RICHARD ROY HOLDEN.